Dec. 20, 1960  R. D. CAVANAUGH  2,965,372
PNEUMATIC ISOLATOR

Filed July 8, 1958  5 Sheets-Sheet 1

INVENTOR.
Richard D. Cavanaugh
BY
Dike, Thompson & Bronstein
ATTORNEYS

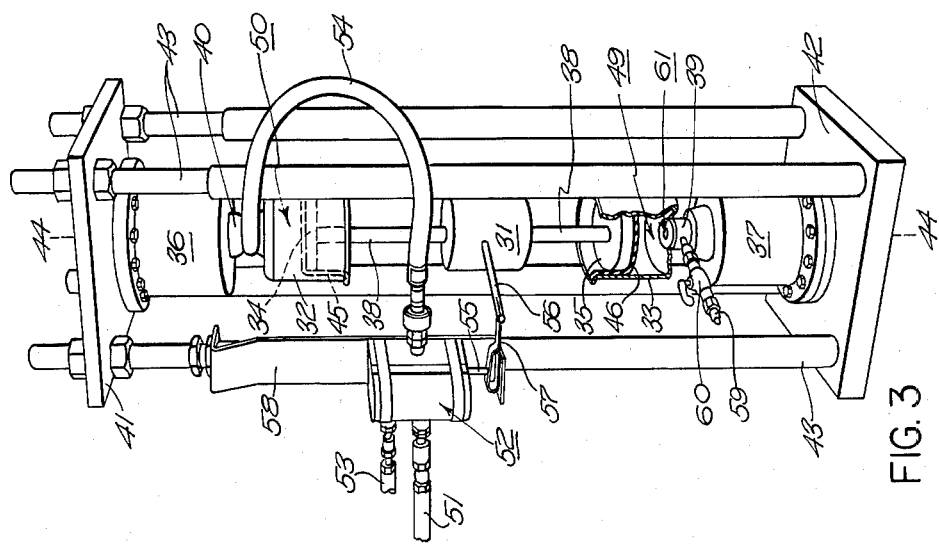

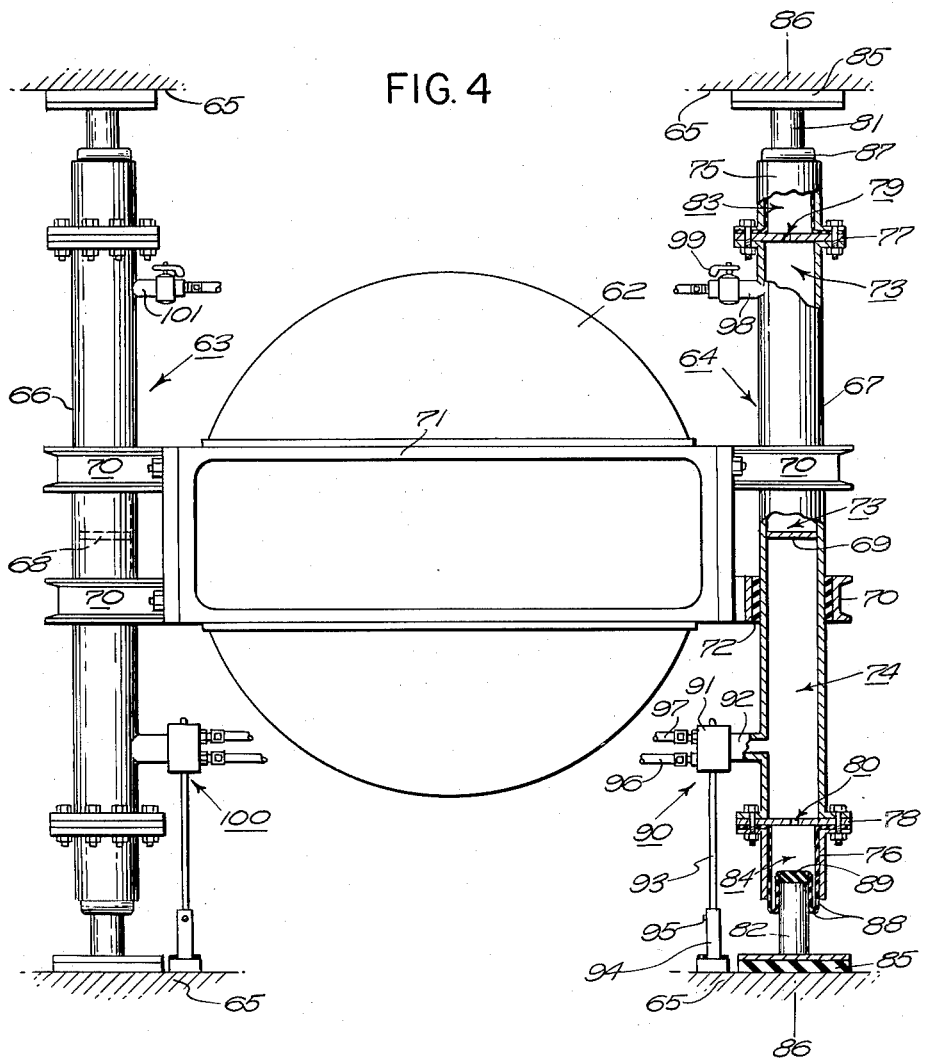

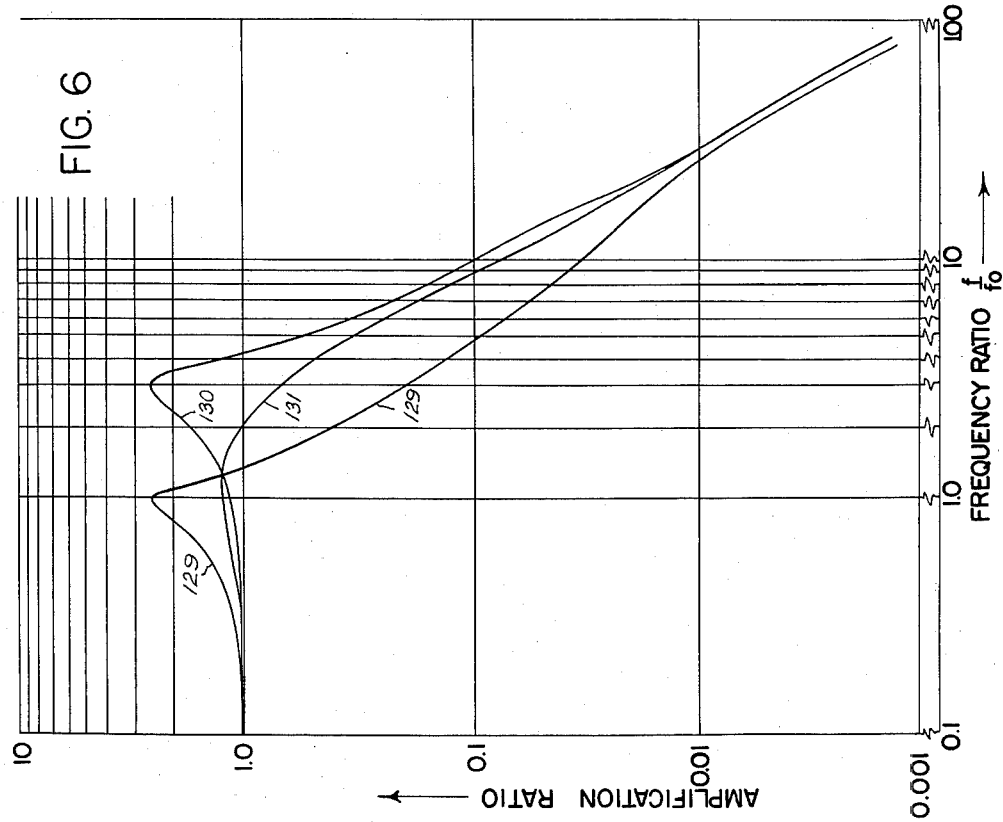
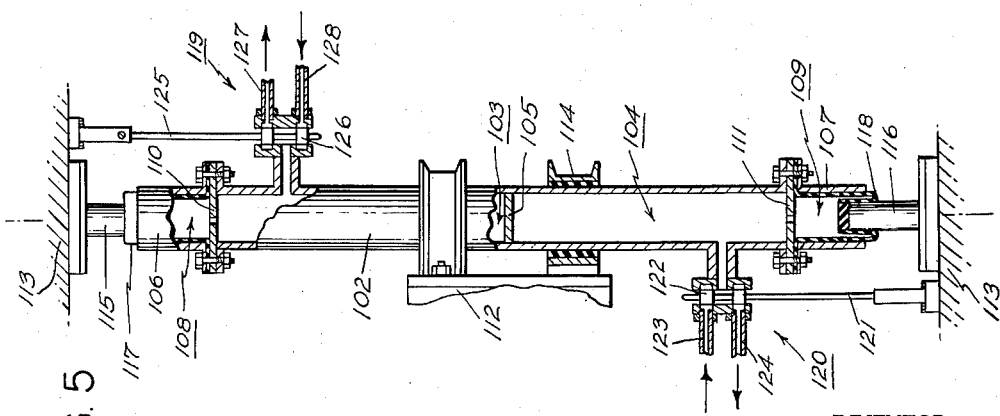

Dec. 20, 1960 R. D. CAVANAUGH 2,965,372
PNEUMATIC ISOLATOR
Filed July 8, 1958 5 Sheets-Sheet 5

INVENTOR.
Richard D. Cavanaugh
BY
Dike, Thompson & Bronstein
ATTORNEYS

United States Patent Office 2,965,372
Patented Dec. 20, 1960

2,965,372

PNEUMATIC ISOLATOR

Richard D. Cavanaugh, Watertown, Mass., assignor to Barry Wright Corporation, a corporation of Massachusetts Filed July 8, 1958, Ser. No. 747,264

12 Claims. (Cl. 267—1)

The present invention relates to improved suspension systems, and, in one particular aspect, to improved pneumatically-actuated apparatus for supporting objects in precision attitudes with isolation from effects of shock and acceleration forces.

Solution of the many problems which accrue when sizable acceleration, shock and vibration forces are imposed upon physically sensitive equipment has traditionally been sought through the use of one or more passive isolation and absorbing elements such as springs and dampers. In known forms of shock absorbers, for example, either hydraulic or pneumatic devices have been utilized to damp and absorb applied forces, and some form of associated spring has also served to return displaced members to desired neutral positions. It is unfortunately characteristic of these suspensions that optimum isolation from disturbing effects such as vibration is achieved only with compliance permitting excessively large displacements under other conditions such as sustained accelerations. Certain equipments may nevertheless require substantial isolation from shock and vibration while yet being intolerant of displacements either because of space limitations or because of attendant errors, as in the case of sensitive aircraft equipment, and any compromise between isolation of vibration and displacement thus remains unsatisfactory.

In accordance with the present teachings, such difficulties are avoided in isolating suspensions including active components which render the static deflection and vibration isolation characteristics substantially independent and adjustable to meet varied requirements. By forming the active components as elements of a critically-operating pneumatic system, an advantageous inherent damping is also realized and natural resonance frequencies are readily limited to desired ranges.

Accordingly, it is one of the objects of the present invention to provide improved apparatus for the suspension of objects in precision relationship to supports therefor while maintaining isolation from effects of shock and vibration.

A further object is to provide improved and accurate suspension and isolation systems wherein self-controlled differential pressure equipments of simple and low-cost construction exhibit the characteristics of critically related dampers and position controllers.

It is yet another object to provide wholly pneumatic suspensions possessing both servo and fluid damping characteristics which maintain advantageous natural resonance frequencies, positional control, and vibration isolation of supported bodies.

By way of a summary account of practice of this invention in one of its aspects, there is provided a pair of fixed and oppositely disposed fluid chambers each cooperating with a piston assembly having a piston member movable in each chamber in response to differential fluid pressures appearing between the chambers. Load equipment which is to be suspended in a predetermined and acceleration-isolated relationship to the fixed support for the fluid chambers is mounted upon the movable piston assembly and normally exerts force, due to its mass, in one direction. A control valve assembly mechanically responsive to relative displacements between the support and suspended load equipment admits compressible gaseous fluid from a pressurized source to an appropriate one of the fluid chambers while either admitting fluid to, or sealing, or exhausting the other chamber to a site of low pressure, whereby the load equipment tends at all times to be forced into a predetermined relationship with the support. Each of the fluid chambers has intercoupled therewith a surge tank of volume having a predetermined relationship to that of the chambers, the intercoupling and the volume relationship being selected to occasion a desired low natural frequency of the suspension and to provide improved damping characteristics.

Although the features of this invention which are believed to be novel are set forth in the appended claims, greater detail of the invention in its preferred embodiments and further objects and advantages thereof may be readily comprehended through reference to the following description taken in connection with the accompanying drawings, wherein:

Figure 1 provides a simplified schematic illustration of one form of pneumatic isolator practicing the present teachings;

Figure 2 is a partly sectioned view of one control valve suited for regulation in an arrangement such as that of Figure 1;

Figure 3 portrays an embodiment of isolator wherein a suspended load is disposed intermediate and fully supported through opposed fluid cylinders;

Figure 4 illustrates a further embodiment of isolation system including a plurality of suspension units of improved construction;

Figure 5 depicts an isolating suspension unit advantageous in preserving a substantially fixed natural resonance frequency;

Figure 7:
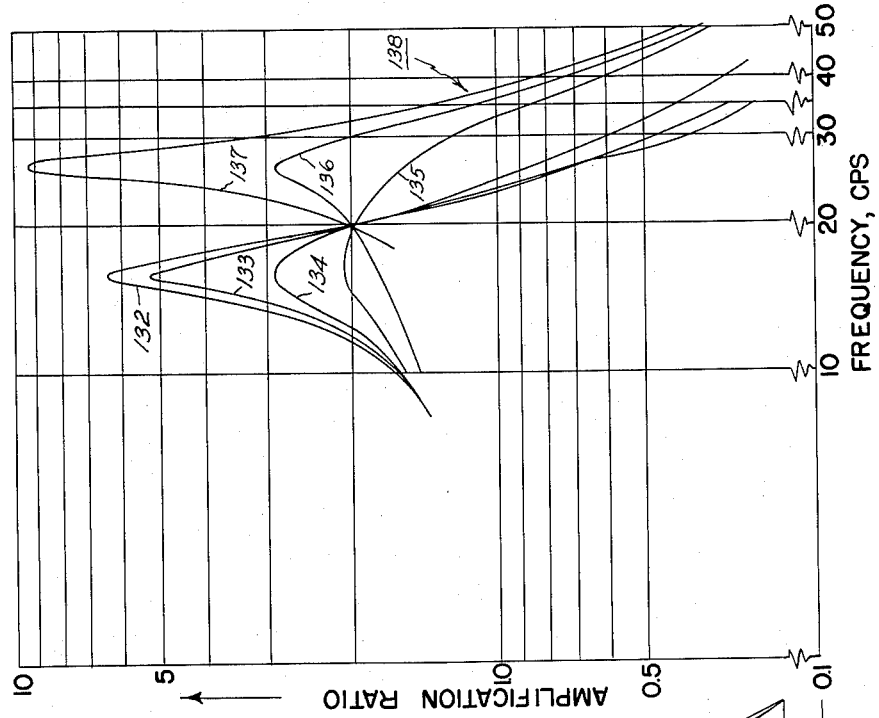
Figure 8:
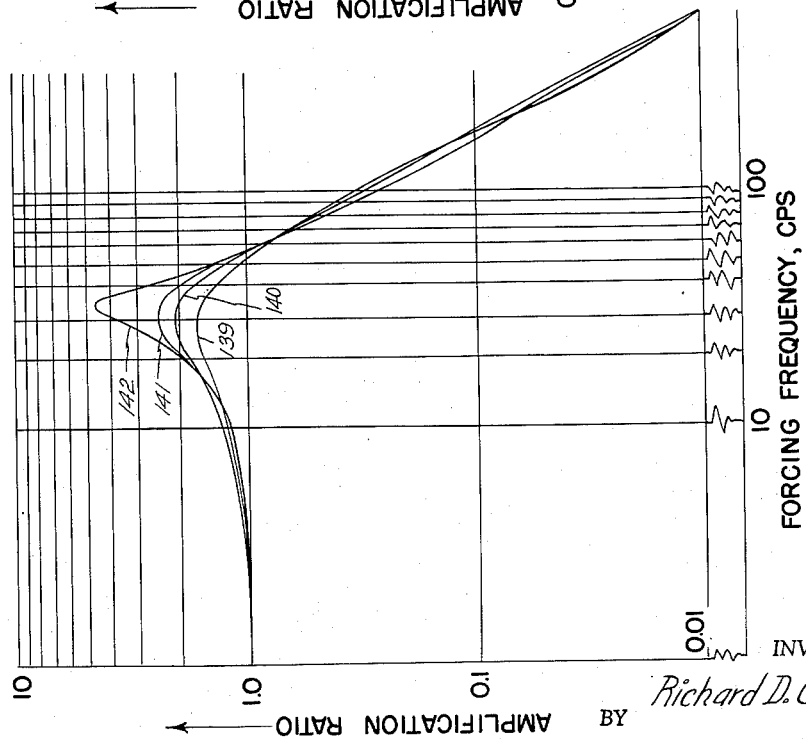

Figure 6 sets forth a curve of amplification ratio vs. frequency characteristic for different conditions of damping;

Figure 7 provides a plot of amplification ratio vs. frequency under controlled damping conditions; and Figure 8 graphically portrays the characteristics of a suspension system under conditions of varied gain.

Figure 1:
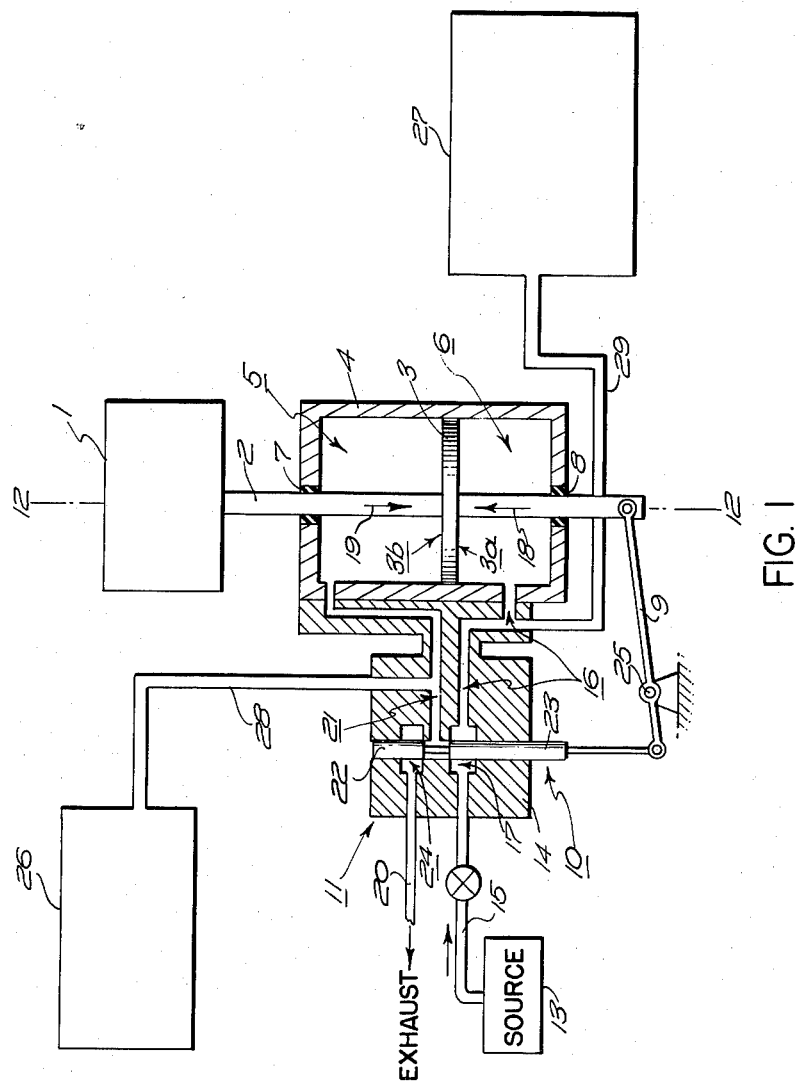

Through reference to the the system portrayed in Figure 1, it will be perceived that the load equipment 1 which is to be suspended in a particular position and isolated from effects of external forces is fixedly mounted upon a piston shaft 2 fastened to the piston 3. The hollow cylinder 4 within which this piston is disposed fits closely about the piston and the latter thus serves to separate the cylinder into two substantially sealed chambers 5 and 6. Piston shaft 2 is represented as passing through alignment bearings 7 and 8 at both ends of the cylinder, and it should further be understood that these bearings permit virtually no fluid leakage therethrough, such that chambers 5 and 6 may be preserved in important fluid-tight conditions. Through a linkage including lever 9, a valve spool 10 of a control valve assembly 11 is caused to respond to relative movements of the cylinder 4 and load equipment 1 along the displacement axis 12—12 and, thereby, to occasion a desired control of the relative pressures produced in the cylinder chambers 5 and 6 by a source 13 of pressurized compressible gaseous fluid, such as air. Valve spool 10 is so shaped and so cooperates with the shaped interior of the valve casing 14 that the full pressure of air supply from source 13 is coupled with chamber 6 at all times during system operation. In this connection, it will be observed that the inlet tube 15 from the source is always in communication with the passageway 16 leading into chamber 6, this communication being established by the annular valve channel 17 surrounding the valve spool. Through this coupling, the pressures in lower cylinder chamber 6 are maintained at levels adequate to occasion support of the piston member 3 within the cylinder at a desired predetermined position intermediate the cylinder ends, such as at the illustrated position. The product of this pressure in chamber 6 and area of the lower surface 3a of piston member 3 then expresses the pneumatically-regulated force exerted in the upward direction of arrow 18 along support axis 12—12. In opposition to this force, along axis 12—12 in the direction of arrow 19, are the combined forces of (a) the weight (mass times acceleration of gravity) of load 1, and (b) that force which is the product of pressure in upper chamber 5 and area of the upper surface 3b of piston member 3. The aforesaid forces are those which occur under somewhat static conditions and which, for the moment, neglect the important effects of externally-applied accelerations to be discussed later herein.

Even absenting any appreciable pressure in upper chamber 5, the pressure of compressible gaseous fluid supplied to chamber 6 by source 13 must reach at least certain minimum levels sufficient to produce the upward forces needed to counteract the opposite thrust of the supported load, else the load will not be preserved in the intended position. Were ambient atmospheric pressure alone continuously exposed to the region occupied by the upper chamber, this environmental pressure could vary over an undesirable range, particularly as experienced aboard airborne craft, and, as is emphasized hereinafter, valuable isolation characteristics would not be secured. By way of distinction, practice of the present teachings involves the use of two substantially sealed and fluid-filled chambers and, in the case of the Figure 1 apparatus, involves both controlled admission of the source pressure to the upper chamber, as required, and controlled relief or exhausting of the same chamber. The source pressure need not be a constant value and may, in fact, vary appreciably without rendering the operation unsatisfactory. The desired control of exhaust and fluid admission to the upper chamber is achieved by the control valve 11, from which lead an exhaust passage 20 and a passageway 21 coupling the upper chamber 5 with the valve interior. Intercoupled valve spool elements 22 and 23 serve to open and close by controlled amounts the paths of communication of the upper chamber valve passageway 21 with the source 13 and the exhaust passage 20, and it will be perceived that the valve spool 10 may thus accomplish regulation of effective pressure in chamber 5 as it is elevated and lowered by the linkage control lever 9. As load 1 is first applied to support shaft 2, the full pressure from source 13 exerts upward force upon piston member 3 and, being of at least a predetermined minimum value, tends to cause the piston member and load to be elevated beyond the position portrayed. Such elevation would in turn act to lower valve spool 10 and thereby admit the source pressure to chamber 5 through passageway 21 while closing the exhaust path of this passageway through valve channel 24. The differences in the pressures in upper and lower cylinder chambers 5 and 6 then approach a negligible value, as do also the differences in the pressure-induced forces exerted upon the surfaces 3a and 3b of the piston member, and load 1 acts to depress the piston member to the desired position. The latter motion induces upward valve spool movement tending to close the upper chamber 5 against the source pressure and to open this chamber to the exhaust line 20, whereby the differential pressures in cylinder 4 can then function to orient the piston member to the intended null or neutral position. Response may be rapid even though the compensation for changes in load may involve several swift cycles of valve operation to occasion the precise orientation of the piston member and load.

Alternatively, where appropriate minute leakage is provided about the valve spool element 22 in valve 11, the control may be caused to become more of a proportional type, and cyclic movements or hunting of the valve and supported load may be reduced. Sensitivity of control is effected by the length of control lever 9 and the positioning of its fulcrum 25, and these will of course be disposed to satisfy the requirements of particular applications.

Under environmental conditions of a steady-state type, such as those which involve sustained constant accelerations, or where only relatively low frequencies of change in experienced loading occur, the unwanted displacements of the load should be corrected quickly and positively. That is, the compliance of the suspension should be small and the system behavior somewhat "hard." Were this the requirement for all conditions likely to be experienced, a common type of hydraulic servo system could be employed for load positioning. However, compensation must also be made for high-frequency disturbances such as those of vibration and transient shock or other acceleration, and a more compliant system is required to prevent the load from moving with its support which encounters these disturbances. Passive isolators which involve springs and dampers may introduce such compliance, but they necessarily fail to prevent unwanted load deflections under the aforesaid steady-state conditions. These apparently irreconcilable demands of isolation systems are overcome in accordance with the present teachings through the dual functioning of the embodying apparatus both as a special form of pneumatic servo and as a distinctive compliant pneumatic spring. While certain types of pneumatic servo units themselves have of course been known heretofore, as in the vehicle suspension art, for example, where a simple piston and cooperating single cylinder chamber have been employed to keep a vehicle body raised, these have not partaken of features here described and have not possessed like isolation characteristics. As it has proceeded thus far, however, description of operation of the Figure 1 apparatus has not embraced the high-frequency performance wherein advantageous isolation is also achieved, and, in this connection, notice should first be taken of the facts that compressible gaseous fluid is delivered by source 13 and that each of the passageways 16 and 21 to chambers 5 and 6 is intercoupled with a surge tank 26 and 27, respectively. The gaseous fluid compressibility introduces a desired resilience into the coupling between piston member 3 and the support cylinder 4, while surge tanks 26 and 27 provided added fluid volumes which enable greater compression and expansion and which yield desirably lower natural resonance frequencies than would be realized with fluid in the chambers 5 and 6 alone, it being appreciated that the latter are preferably of small physical size.

The compressible fluid itself tends to provide a certain amount of damping, such that isolation effects are improved near the natural resonant frequency of the fluid within the system. This damping is not itself sufficient for optimum isolation, however, and a major improvement in isolation over a wide frequency range is instead achieved by maintaining the natural resonant frequency at a low value, the surge tanks 26 and 27 providing the volume necessary to realize the low natural resonant frequency. Reason for such improvement is found in the operating characteristic of the system whereby, beyond the resonance frequency, amplification factor (movement of the load divided by movement of the support) declines as a function of the square of the frequency of impressed vibration. This decline is to be contrasted with that merely varying as a function of frequency, in the case of viscous damping, for example. As a consequence, superior isolation characteristics accrue with the natural frequency preserved at a low value, in conjunction with optimum damping, and with amplification factor automatically diminishing rapidly in the higher frequency ranges where vibration isolation is of such importance. Each of surge tanks 26 and 27 is coupled with its associated cylinder chamber, 5 and 6, respectively, such that the combination possesses one low natural resonant frequency, and it will be understood that the proportions of the tanks and chambers will be selected to yield a frequency desired in a particular application. Optimum damping which assures a minimum amplification factor at and near resonance is achieved through losses in the intercouplings between the surge tanks and cylinder chambers, as in the somewhat restricted and elongated coupling tubes 28 and 29. In other arrangements, damping may instead be occasioned by orifices or comparable restrictions. Damping restrictions are not made so minute as to cause a surge tank to be entirely divorced or blocked from its associated cylinder chamber, however, because then the natural resonance frequency of the fluid system would simply be related to the relatively high resonance frequency of the cylinder chamber alone. As a practical matter, the damping restriction may in fact be relatively small nevertheless, because permitted stroke of piston member 3 never becomes large enough to cause substantial pressure to build up or diminish within the cylinder chambers before being immediately communicated to the surge tanks.

It is highly important to realize that the spring constant of the compressible gaseous fluid, such as air, is directly proportional to its absolute pressure, and that the resilience of the isolating suspension thus depends upon such pressure. If the suspension were of a known type pressurized by varying amounts only on one side of a movable piston or other suspension member, the absolute pressure could not be varied to obtain a desired spring constant and resiliency without also entirely upsetting the position of the load from the desired orientation. And, if the suspension were one operating in the manner of a conventional servo motor having pressure applied to one or another side of a movable piston as required, the absolute values of pressure experienced by the fluid would vary with loading and would appear only on one or the opposite side of the piston at any instant. Hence in the latter case, the resiliency characteristics could vary intolerably, insofar as isolation purposes are concerned. By way of distinction, however, the Figure 1 apparatus is seen to be continuously pressurized in lower chamber 6 at the level of pressure from source 13, which pressure may be set to establish desired spring constants. This pressure need not be varied, and the spring constant may thus be preserved within desired ranges, because the positional control and isolation are achieved through differential pressures rather than absolute pressure values. Therefore, it is possible to select system resiliency simply by adjustment of the source pressure, because the differential pressure control of the load will not be materially disturbed. Further, the differential-pressure control is also of special significance in that unintended variations in source pressure over a wide range will nevertheless not result in loss of accuracy in load positioning.

Valve 11 is designed to preserve each of the combinations of a cylinder chamber with a surge tank in a substantially closed condition insofar as preservation of resonance frequency conditions is concerned. Each chamber and its surge tank have an ample communication which permits them to act as a single volume, but, if the valve were to fully expose them to a low pressure site without sufficient restriction, the desired resonance condition would be lost. In fact, however, the clearances in valve 11 permit only minute leakage and, even when the valve is actuated to relieve pressures in the upper chamber through the exhaust lead 20, the relief flow is sufficiently choked or restricted to preserve a substantially closed volume of upper chamber 5 and its surge tank 26 for purposes of promoting system resiliency and low natural frequency. Such restriction may be occasioned not only in the valve clearances but through appropriate proportioning of exhaust lead 20 and the section of passageway 21 which communicates with the valve.

The Figure 2 illustration of a form of control valve which may be utilized in the practice of this invention is functionally comparable to that of valve 11 in Figure 1, although certain construction differences are present, and for purposes of simplification the same reference characters with distinguishing single-prime accents have been employed to designate like portions. In this arrangement, the supply of pressurized compressible gaseous fluid from a source (not viewed) is coupled to valve channel 17' of valve 11'' by way of inlet 15' and is separately coupled to the constantly-pressurized chamber and surge tank of a suspension cylinder through a conduit 16' which entirely by-passes the valve. Axial positioning of valve spool 23' regulates admission of pressurized fluid to the opposite cylinder chamber and its surge tank through conduit passageway 21'. And, valve spool 22' similarly regulates the relief of pressure from the latter chamber and tank through the same passageway and exhaust lead 20'. Valve spools 22' and 23' move in the same axial directions simultaneously as the valve rod 30 to which they are affixed is displaced by an associated control linkage, and the pressure in the variable-pressure suspension cylinder chamber may thus be controlled sensitively. Small amounts of fluid leakage between the valve spools and the shaped interior of the valve casing may permit an even control.

In another suspension apparatus arrangement depicted pictorially in Figure 3, the load 31 is supported somewhat differently, in that it is disposed intermediate the two piston cylinders, 32 and 33, which are axially spaced, and a pair of cooperating interconnected piston members 34 and 35 are also employed. Further, the pressurization of one of the cylinder chambers in this construction may be maintained substantially constant without continuous application of such pressure from an outside source. Damping is introduced by simple orifices, whereby a colinear arrangement of surge tanks 36 and 37 with the cylinders 32 and 33, respectively, yields an advantageous mechanical assembly.

Load 31 is fixed axially with the shaft 38 connecting both piston members, at a suitable intermediate position affording clearance for limited axial movements responsive to impressed forces. Both cylinders, 32 and 33, are colinearly affixed with one another and with their associated surge tanks, through orifice-equipped connections 39 and 40, and the tanks are maintained at a fixed axial spacing by frame plates 41 and 42 structurally connected by frame rods 43. By virtue of this physical arrangement, the aligned cylinders function as guide bearings and maintain the piston members and shaft in a preferred orientation colinearly with the vertical suspension axis 44—44. Piston members 34 and 35 are preferably in a sealed relationship with the cylinders, else pressurized gaseous fluid leakage to the ambient atmosphere can ultimately disturb operation of the suspension, and it is for this reason that flexible rolling diaphragms 45 and 46 are used to provide such sealing while enabling freedom for certain axial displacements which must take place.

In the Figure 3 construction, loads or forces tending to deflect the support shaft 38 in vertical directions from a null position are opposed by fluid pressures exerted upon piston members 34 and 35.

A necessary supply of pressurized compressible gaseous fluid is admitted to upper chamber 50 from supply line 51 through control valve 52, which may be of a construction like that illustrated in Figure 2. Pressure relief or exhaust may occur through line 53, and both the pressurization and pressure relief of chamber 50 occur through the line 54 coupled to the valve at one end and to the upper cylinder connection 40 at the other end. Valve spool rod 55 is appropriately actuated in accordance with displacements of load 31 in relation to the support frame by way of a linkage including load connection 56 and a lever arm 57 mounted for angular deflection on a support frame bracket 58. In one practice, the lower cylinder chamber 49 may also be continuously pressurized, by way of a supply line 59, although this need not be done if the chamber is pressurized to a certain extent and is fully sealed, as by closure of the valve 60. The desired pressurization of the lower chamber may in fact be accomplished simply by admitting atmospheric pressure, sealing the chamber, and permitting the load forces to vary the pressure. Lower chamber 49 and the associated surge tank 37 are of course proportioned to exhibit a desired low natural resonance frequency characteristic. Important damping effects are achieved in the like orifices appearing in interconnections 39 and 40, the orifice associated with the former being designated by reference character 61. As has been noted earlier, the orifice restrictions are proportioned to yield optimum damping, but without so isolating the piston chambers from their surge tanks that their combined volumes cannot act together to yield low natural resonance frequencies. Performance of systems having low natural frequencies is particularly sensitive to friction, since the dynamic forces available to counteract friction are relatively small, and thus the low-friction rolling diaphragms 45 and 46 are of special advantage.

As displacement forces of a steady-state or slowly-varying character are applied in the upward direction along axis 44—44, control valve 52 becomes actuated through its linkage to increase the pressure effective in upper chamber 50 and, thereby, to exactly counteract the combined displacement and lower cylinder forces or to exceed them sufficiently to drive the load downwardly to the intended neutral position. The differential of pressures in chambers 49 and 50 is automatically varied by the control valve as required, through supply and relief of the upper chamber 50, to yield compensatory positioning of the load in both axial directions. Particularly as the low natural resonance frequency of the fluid suspension is approached, the damping influences of the two orifices function to suppress the disadvantageous tendencies of the load to experience more displacement from neutral. When the frequency of the displacement forces becomes progressively higher and exceeds the damped natural resonance frequency, as under imposed vibration conditions, for example, the system amplification factor diminishes with the square of imposed frequency, and the suspended load becomes progressively better isolated from the external disturbances. Response of the control valve under the latter conditions is relatively slow and thus does not impair vibration isolation by the confined fluid volumes, although under low-frequency or steady-state conditions these same valve responses are nevertheless sufficiently rapid to correct the load position properly. It should be understood that the control valve assembly on bracket 58 may be mounted upon the supported load 31 to avoid a resonating responsive to vibration and shock in certain applications, in which case the actuating connection 56 is simply fixed with a support frame.

The latter control valve arrangement is embodied in the isolating suspension of sensitive equipment 62 depicted in Figure 4. There, a plurality of suspension units, represented by like units 63 and 64, provide combined support for the equipment 62, which may, for example, comprise delicate craft guidance apparatus which should normally be preserved in a precise orientation relative to the support structure 65 but should also be preserved in a full highly-isolated condition insofar as severe environmental shock, acceleration and vibration are concerned. Each of the support units 63 and 64 includes as a principal structure element an elongated tubular member, 66 and 67, respectively, divided into separated upper and lower surge tank chambers by plates 68 and 69 which are sealed with their respective tubular members. Clamping elements 70 fasten these tubular members in supporting relation to the main frame 71 of equipment 62, preferably through insulating and somewhat resilient sleeves such as that designated by numeral 72. Referring to the illustration of unit 64, the upper and lower surge tank chambers 73 and 74 are proportioned to have desired volumes, and these are bolted colinearly with upper and lower piston cylinders 75 and 76 at the outer ends thereof, the orifice plates 77 and 78 having damping orifices 79 and 80 therethrough and being disposed between the surge tank and cylinder portions of the suspension. The piston members 81 and 82 which are disposed within the piston chambers 83 and 84, respectively, of cylinders 75 and 76, are not fixed with the load equipment but, instead, are fixed with the support structure 65 through resilient shear pads 85 at a predetermined spacing along the support axis 85—85, such that the tubular surge tanks and piston cylinders and load may be displaced in relation to them. As in the case of the embodiment of Figure 3, flexible fluid-tight rolling diaphragms, 87 and 88, are sealed with the cylinders and with the piston members to yield a low-friction assembly involving virtually no leakage. The piston members may be capped by a resilient pad member, such as member 89, which cooperate with the orifice plates to afford a cushioned rest for the suspension in a passive condition. In addition, a degree of further vibration isolation in directions lateral to the suspension axis is furnished by the aforesaid resilient shear pads 85.

Control valve 90 regulates the pressurization in lower surge tank and piston chambers 74 and 84 in a manner similar to that described in connection with the Figure 3 embodiment. The valve casing 91 is itself mounted upon the isolated and suspended tubular member 67, by way of the fluid inlet coupling 92, and its actuating rod 93 is fixed with the support structure 65 through a mounting bracket 94 in which it is vertically adjustable by manipulation of a set screw 95. A pressurized fluid supply line 96 and relief line 97 are coupled with the valve also. Pressurization of the upper surge tank and piston chambers 73 and 83 to a desired degree, including a fixed value of atmospheric pressure as an example, is realized through a conduit 98 having a valve 99 which may seal the chambers against loss of fluid once a desired pressurization has been established. In this system, the combined fluid volumes in each pair of a surge tank and cylinder possesses a desired low natural resonance frequency, with the responses being damped by the orifice plates 79 and 80, and the vibration isolation beyond resonance diminishes advantageously with the square of experienced frequencies of disturbances. Sustained or slowly changing disturbances are corrected by increase and decrease in the pressure in the lower chambers, through action of the control valve, and it will be understood that the normal pressure in the upper chambers would be less than that available over supply line 96 to permit the suspension to elevate the load to the illustrated neutral position.

Unit 63 is of construction and operation comparable to those of suspension unit 64, and cooperates in supporting and isolating the load. Other units not separately illustrated in Figure 3 can likewise contribute to the suspension. While a separate control valve assembly 100 is shown in association with support unit 63, its function may alternatively be assumed by the control valve 90, which then serves both units. With the entire assembly of Figure 4 mounted in an inverted position, such that the force of gravity is normally effective in the opposite direction, the inlets 98 and 101 apply fluid supply pressures which are sufficiently high to preserve the load at a neutral position, and control valves 90 and 100 regulate the other pressures to values needed to maintain this position as steady-state or slowly-varying disturbances of the support structure are experienced.

Regulated pressurization of both the fluid chambers which occasion the necessary differential pressures may be desirable in some applications, and a suspension unit incorporating such dual control appears in Figure 5. In this construction, the surge tank elements are also formed from a tubular member, 102, divided into surge tank cavities or chambers 103 and 104 by a fluid-tight separating plate 105, and piston cylinders 106 and 107 have their fluid chambers 108 and 109 interconnected with these cavities through orifice plates 110 and 111. Load equipment 112 which is to be suspended in relation to a support structure 113 is mounted with the tubular member 102 by clamps 114, and the piston members 115 and 116 cooperating with the piston cylinders and rolling diaphragms 117 and 118 are fixed upon structure 113.

Two control valves, 119 and 120, are employed to establish desired differential pressures for the load suspension, their actuations being of opposite sense at any instant. For example, if load 112 becomes downwardly displaced, the actuating rod 121 therefor causes the valve spool structure 122 to admit pressurized fluid from source line 123 into the interior of chambers 104 and 109 while maintaining the pressure relief line 124 in a substantially closed state. This same downward movement has an opposite influence upon valve 119, in that the actuating rod 125 fixed to support 113 causes valve spool structure 126 to open relief line 127 to the upper chambers 103 and 108 while tending to close the fluid supply line 128. Increased pressurization of the lower cylinder chamber and the attendant decreased pressurization of the upper-cylinder chamber results in a differential pressure operating to oppose the load displacements. Reversed actions obviously occur upon upward displacement of the load. Damping, and isolation at higher frequencies, occur in a manner already described. A particularly advantageous aspect of this construction lies in its preservation of a substantially fixed natural resonance frequency, which may be of special value in certain applications. Reason why this uniform natural frequency characteristic results may be found from the expression:

$$f_n = \text{natural frequency} = \sqrt{\frac{2nA^2(P_u + P_l)g}{(V_u + V_l)W}}$$

where
$P_u$ = pressure in upper cylinder chamber 108
$P_l$ = pressure in lower cylinder chamber 109
$V_u$ = combined volumes of upper chambers 108 and 103
$V_l$ = combined volumes of lower chambers 109 and 104
$W$ = weight of supported structure, including the load
$g$ = acceleration of gravity
$n$ = factor representing ratio of heats for polytropic process
$A$ = area of each piston member (piston and diaphragm effective areas combined)

The supporting force for the system $F_s$ is given by:

$$F_s = (P_l - P_u)A$$

In another embodiment which preserves a substantially fixed pressure in one cylinder chamber, this supporting force may be increased by simply increasing $P_l$, with accompanying increase in $f_n$, or decreased by simply decreasing $P_u$, with accompanying decrease in $f_n$. It will thus be observed that the natural frequency $f_n$ may be maintained at substantially a given value only when the pressures are manipulated in both cylinder chambers, as in the Figure 5 embodiment. Valve spools for the two control valves 119 and 120 may of course be jointly actuated by a single control rod, rather than separately by rods 121 and 125, and the various valve components may conveniently be assembled in one valve casing.

Further understanding of operating characteristics of the isolating suspensions is aided through reference to the characteristic curves portrayed in Figures 6 through 8. In Figure 6, amplification ratio is plotted against frequency ratio, both on logarithmic scales, for a fluid-filled pressurized system having zero valve gain, that is, where the control valve means is fixed to remain unactuated. Amplification ratio there represents the sum of support structure movement and movement of the suspended load relative to the support structure divided by the support structure movement. And, frequency ratio represents the frequency of displacement forces moving the support structure divided by the natural frequency of the system with zero damping. The system investigated involves a surge tank chamber volume about eight times that of cooperating cylinder chamber volume. Variations in damping were obtained through use of interconnecting orifice plates of different dimensions. Curve 129 obtains with damping of less than optimum value; curve 130 involves damping greater than optimum; and curve 131 shows that with optimum damping the resonant peak is desirably low and broad and amplification minimized. As has already been noted, the natural resonance frequency in a system may be lowered to preferred values by increasing the volumes of the associated surge tank chambers.

Utilizing a similar system in a like manner, a family of curves have been prepared, in Figure 7, under damping conditions altered by variation in orifice diameter in orifice damping interconnections. Amplification factor has in this instance been plotted against the frequency of disturbance of the supporting structure, both the ordinate and abscissa being logarithmically scaled, and the ratio of surge tank to cylinder chamber volumes has been lowered to about three. With chamber air pressure of about 38 pounds per square inch, a supported assembly weighing 12 pounds, effective piston areas of 11 square inches, and cylinder chamber and surge tank chamber volumes of about 15 and 48 cubic inches, respectively, the orifice diameters were varied as follows:

| Curve No.: | Orifice diameter, inch |
|---|---|
| 132 | 0.462 |
| 133 | 0.326 |
| 134 | 0.206 |
| 135 | 0.146 |
| 136 | 0.102 |
| 137 | 0.052 |

Curve 135 represents the most nearly optimum damping condition. The desirably rapid decline in amplification ratio at higher frequencies, which has been referred to earlier, becomes apparent from inspection of the trend in regions designated generally by numeral 138.

The further plot in Figure 8, wherein the ordinate and abscissa are factors comparable to those in Figure 7, illustrates responses in an isolating suspension system having substantially optimum damping and different gain conditions occasioned by the control valve means. Valve control is not found to alter the value of damping which produces optimum response, rather, it alters the response amplitudes in the region of resonance. Effective piston area in this case was about 12 square inches, initial pressure 40 pounds per square inch, surge tank chamber volume 24 cubic inches, cylinder chamber volume about 6 cubic inches, and total piston stroke about one inch. Variations in gain in the valve controlled system yielded the following curves:

| Curve No.: | Valve gain |
|---|---|
| 139 | 0 |
| 140 | 312 |
| 141 | 624 |
| 142 | 1248 |

From the standpoint of optimum isolation, it is obviously desirable to introduce the least gain commensurate with satisfactory steady-state operation of the system. Gain adjustments are readily achieved through variation of mechanical advantages in the control valve linkages, for example.

While particular embodiments of this invention have been shown and described herein, it will occur to those versed in the art that various changes, modifications and substitutions may be effected without departing either in spirit or scope from the invention as set forth in the appended claims.

What I claim as new and desire to secure by Letters Patent of the United States is:

1. Apparatus for suspending a load in relation to a support, comprising a pair of relatively movable suspension means each fixed with a different one of said load and support, the acceleration of gravity urging said load in one direction relative to said support, one of said relatively movable means including cylinder means, the other of said relatively movable means including piston means disposed in a cooperative fluid-tight relationship with said cylinder means defining two cylinder chambers and movable relative to said cylinder responsive to differences in fluid pressures in said chambers, a pair of surge tank means each including a fluid-tight surge tank fluid chamber, means interconnecting each of said surge tank chambers in fluid-communicating relationship with a different one of said cylinder chambers through damping passageways restricted in cross-section relative to said chambers, said interconnected chambers each having relatively large combined volumes occasioning a relatively low natural resonance frequency, said damping passageways of said interconnecting means being proportioned to preserve said low natural resonance frequency and to absorb quantities of energy from fluid flowing therethrough which minimize amplification at resonance, a source of compressible fluid under pressure, means applying the full pressures of fluid from said source to one of said cylinder chambers to develop forces tending to move said load in a direction opposite to said one direction, adjustable control valve means supplied with fluid by said source and coupled to supply the other of said cylinder chambers with fluid under pressures up to said fluid pressures, and means adjusting said control valve means responsive to displacements of said support and load from a predetermined relationship.

2. Apparatus for suspending a load in relation to a support, comprising a pair of relatively movable suspension means each fixed with a different one of said load and support, one of said relatively movable means including cylinder means, the other of said relatively movable means including piston means disposed in a cooperative fluid-tight relationship with said cylinder means providing two fluid chambers and movable relative to said cylinder means responsive to differences in fluid pressures in said chambers, said chambers each having a relatively large volume occasioning a relatively low natural resonance frequency, source means supplying compressible gaseous fluid under pressure, a pair of control valves each coupled between said source and a different one of said chambers and each adjustable to couple a different one of said chambers with said source means and with a site of relatively low fluid pressure to extents depending upon adjustments of a movable valve member thereof from a predetermined position, and means simultaneuosly adjusting said control valve members responsive to displacements of said load and support from a predetermined relationship, said adjusting means adjusting one of valve members in a direction to couple one of said chambers with said source means while adjusting the other of said valve members in a direction to couple the other of said chambers with said site of low pressure, whereby said control valves occasion pressures in said chambers preserving said load and support in substantially said predetermined relationship and isolating said load from shock and vibration of said support.

3. Apparatus for suspending a load in relation to a support, comprising a pair of spaced cylinder members each having a substantially cylindrical chamber therein, said chambers having their longitudinal axes collinear along an axis of suspension, a pair of interconnected pistons each disposed for movement along said axis within a different one of said cylinders, means fastening said load with said interconnected pistons intermediate said pistons and cylinders, a pair of surge tanks each having a cavity therein and each disposed near the outer end of a different one of said cylinder members, damping means interconnecting each of said surge tank cavities with the cylindrical chamber of the proximate cylinder member in fluid-communicating relationship, said interconnecting means being dimensioned to absorb energy from fluid flowing between said chambers and cavities and to preserve a low natural resonance frequency of said interconnected chambers and cavities, means mounting said surge tanks and cylinder members in a fixed relationship upon said support, a source of compressible gaseous fluid under pressure, means coupling said source with said chambers, said coupling means comprising control valve means supplied with fluid by said source and adjustable to supply at least one of said chambers with controlled variable pressures of fluid, and means adjusting said control valve means responsive to displacements of said support and said load from a predetermined relationship along said axis.

4. Apparatus as set forth in claim 3 wherein said axis is disposed substantially vertically and wherein one of said chambers is disposed above and the other below said interconnected pistons, and wherein said coupling means further comprises means preserving said other chamber pressurized with fluid, and wherein said control valve means supplies said one chamber with said controlled variable pressures of fluid, said chambers and cavities being preserved substantially fully sealed except for the connections to each other and to the valve means.

5. Apparatus for suspending a load in relation to a support, comprising a pair of piston members mounted upon said support in a fixed spaced relationship along an axis of suspension, a pair of spaced cylinder members each having a substantially cylindrical chamber therein, said chambers having their longitudinal axes collinear along said axis, each of said pistons members being disposed within a different one of said cylinder members in cooperative fluid-tight relationship therewith, surge tank means disposed intermediate and fixed with said cylinder members and having two cavities therein, damping means interconnecting each of said cavities with a different one of said chambers in fluid-communicating relationship, said interconnecting means being dimensioned to absorb energy from fluid flowing between said chambers and cavities and to preserve a low natural resonance frequency of said interconnected chambers and cavities, means fastening said load with said surge tank means and cylinder means, a source of compressible gaseous fluid under pressure, means coupling said source with said chambers, said coupling means comprising control valve means supplied with fluid by said source and adjustable to supply at least one of said chambers with controlled variable pressures of fluid, and means adjusting said control valve means responsive to displacements of said support and load from a predetermined relationship along said axis.

6. Apparatus as set forth in claim 5 wherein said coupling means preserves the other of said chambers pressurized with fluid, and wherein said control valve means supplies said one of said chambers with said controlled variable pressures of fluid, and wherein said interconnecting means includes members each having at least one orifice therethrough.

7. Apparatus as set forth in claim 5 wherein said surge tank means comprises an elongated hollow tube structure having the longitudinal axis thereof collinear with said chambers and having a member intermediate the ends thereof separating the interior of said structure into said cavities.

8. Apparatus as set forth in claim 5 further comprising flexible rolling diaphragms sealing each of said piston members with a different one of said cylinder members to permit low-friction relative displacements between said piston and cylinder members, whereby said cylinder chambers are each preserved in a substantially fluid-filled condition which isolates said load from shock and vibration of said support.

9. Apparatus as set forth in claim 5 wherein said control valve means includes casing means having passageways for coupling at least one of said chambers with said source and with a site of fluid pressure low in relation to the pressure from said source, valve means relatively movable in relation to said casing means for selectively opening and closing said passageways to couple said chamber with said source and site of low pressure, and means mounting said valve casing means in substantially fixed relation to said suspended load, and wherein said adjusting means connects said relatively movable valve means with said support.

10. Apparatus as set forth in claim 9 wherein said control valve means passageways are disposed to couple both of said chambers with said source and said site of low pressure, and wherein said relatively movable valve means and passageways are disposed to apply pressure from said source to one of said chambers and simultaneously to relieve pressure to said low pressure site from the other of said chambers upon relative movement of said casing means and relatively movable valve means, whereby the natural resonance frequency of said apparatus remains substantially fixed.

11. Apparatus for suspending a load in relation to a support, comprising a pair of relatively movable suspension means each fixed with a different one of said load and support and disposed in a cooperative fluid-tight relationship with one another and defining walls of two fluid chambers, one of said suspension means being movable relative to the other of said suspension means responsive to differences in fluid pressures in said two chambers, a pair of surge tank means each including a fluid-tight surge tank chamber, means interconnecting each of said surge tank chambers in fluid communicating relationship with a different one of said fluid chambers, the interconnected and communicating surge tank and fluid chambers each having relatively large combined volumes occasioning a relatively low natural resonance frequency, at least one of said interconnecting means being proportioned to absorb energy from fluid flowing between a surge tank chamber and a fluid chamber and to preserve said low natural resonance frequency, a source of compressible gaseous fluid under pressure, means coupling said source with both of said fluid chambers to supply said fluid under pressure thereto and to said surge tank chambers continuously and to maintain both of said fluid chambers pressurized continuously, said coupling means comprising adjustable control valve means for adjusting the fluid pressures in at least one of said fluid chambers, said control valve means being adjustable to couple to said one of said fluid chambers compressible gaseous fluid at high pressures from said source and to relieve fluid pressure from said one fluid chamber through a coupling to a site of lower pressure, and means for adjusting said control valve means responsive to displacements of said support and said load from a predetermined relationship.

12. Apparatus for suspending a load in relation to a support, comprising a pair of relatively movable suspension means each fixed with a different one of said load and support, one of said relatively movable means including cylinder means, the other of said relatively movable means including piston means disposed in a cooperative fluid-tight relationship with said cylinder means defining two cylindrical chambers and movable relative to said cylinder means responsive to differences in fluid pressures in said chambers, a pair of surge tank means each including a fluid-tight surge tank fluid chamber, means interconnecting each of said surge tank chambers in fluid-communicating relationship with a different one of said cylinder chambers, the interconnected and communicating surge tank and cylinder chambers each having relatively large combined volumes occasioning a relatively low natural resonance frequency, said interconnecting means being proportioned to absorb energy from fluid flowing between a surge tank chamber and a cylinder chamber and to preserve said low natural resonance frequency, a source of compressible fluid under pressure, means coupling said source with said cylinder chambers to supply fluid thereto, said coupling means comprising adjustable control valve means for adjusting the fluid pressures in at least one of said cylinder chambers, said adjustable control valve means being adjustable to couple to said one of said cylinder chambers fluid up to the full pressures of said source and to relieve fluid pressures from said one cylinder chamber through a coupling to a site of lower pressure, said coupling means further comprising means applying said full pressures of fluid from said source to the other of said cylinder chambers, and means adjusting said control valve means responsive to displacements of said support and said load from a predetermined relationship.

References Cited in the file of this patent

UNITED STATES PATENTS

| | | |
|---|---|---|
| 1,244,752 | McCrosson | Oct. 30, 1917 |
| 1,291,016 | Kellogg | Jan. 14, 1919 |
| 1,522,243 | Hughes | Jan. 6, 1925 |
| 2,523,714 | Nilsson | Sept. 26, 1950 |
| 2,861,794 | Beck | Nov. 25, 1958 |